United States Patent
Kobayashi (10) Patent No.: US 10,239,338 B2
(45) Date of Patent: *Mar. 26, 2019

(54) DECORATING MATERIAL IRRADIATED ELECTRON BEAM RESIN LAMINATED ON SUBSTRATE

(75) Inventor: Takeshi Kobayashi, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 664 days.

This patent is subject to a terminal disclaimer.

(21) Appl. No.: 11/337,069

(22) Filed: Jan. 23, 2006

(65) Prior Publication Data

US 2006/0204729 A1    Sep. 14, 2006

(30) Foreign Application Priority Data

Jan. 24, 2005   (JP) .................................. 2005-15414

(51) Int. Cl.
  *B41M 5/00*   (2006.01)
  *B41M 7/00*   (2006.01)

(52) U.S. Cl.
  CPC ........ *B41M 7/0081* (2013.01); *B41M 7/0045* (2013.01); *Y10T 428/24802* (2015.01)

(58) Field of Classification Search
  USPC .............................................. 428/195.1, 156
  See application file for complete search history.

(56) References Cited

U.S. PATENT DOCUMENTS

| | | | | |
|---|---|---|---|---|
| 1,597,539 | A | * | 8/1926 | Novotny et al. ............. 428/525 |
| 5,085,921 | A | * | 2/1992 | Jayarajan ..................... 428/204 |
| 5,754,338 | A | * | 5/1998 | Wilson .................. B29C 65/608 |
| | | | | 359/529 |
| 6,326,074 | B1 | * | 12/2001 | Takahashi ..................... 428/156 |
| 6,428,875 | B1 | * | 8/2002 | Takahashi et al. ........... 428/172 |
| 6,558,799 | B2 | * | 5/2003 | Takeuchi et al. .......... 428/423.1 |
| 6,841,221 | B2 | * | 1/2005 | MacQueen ................... 428/141 |

(Continued)

FOREIGN PATENT DOCUMENTS

| | | |
|---|---|---|
| JP | 11-227148 A | 8/1999 |
| JP | 2001-303474 A | 10/2001 |

(Continued)

*Primary Examiner* — Tamra L. Dicus
(74) *Attorney, Agent, or Firm* — Sughrue Mion, PLLC (57) ABSTRACT

There is provided a decorative material which hardly undergoes deterioration of a substrate even when irradiated with an electron beam, and is excellent in surface properties such as stain resistance, abrasion resistance and marring resistance. The decorative material of the present invention comprises a substrate, and a pattern layer and/or a colored layer, and a surface protective layer which are successively laminated on the substrate, wherein the surface protective layer is obtained by crosslinking and curing an electron beam-curable resin composition, and a rate of reduction in a folding endurance of a material obtained by applying the electron beam-curable resin composition onto the substrate and then irradiating an electron beam to the electron beam-curable resin composition, relative to a folding endurance of the substrate before applying the electron beam-curable resin composition thereonto is 70% or lower as measured in the CD direction (lateral direction) of the substrate.

6 Claims, 3 Drawing Sheets

(56) References Cited

U.S. PATENT DOCUMENTS

| | | | | |
|---|---|---|---|---|
| 6,890,625 | B2* | 5/2005 | Sigel | B05D 5/061 428/195.1 |
| 7,195,812 | B2* | 3/2007 | Sigel | B05D 5/061 428/195.1 |
| 7,291,400 | B2* | 11/2007 | Yokochi | 428/511 |
| 2003/0055151 | A1* | 3/2003 | Usuki | B41M 5/38214 524/487 |
| 2004/0265569 | A1* | 12/2004 | Yokochi et al. | 428/323 |
| 2005/0129970 | A1* | 6/2005 | Yokochi | 428/542.2 |
| 2006/0147674 | A1* | 7/2006 | Walker, Jr. | C08J 7/047 428/141 |

FOREIGN PATENT DOCUMENTS

| | | |
|---|---|---|
| JP | 2004-175449 | 6/2004 |
| JP | 2004-258278 A | 9/2004 |

* cited by examiner

DECORATING MATERIAL IRRADIATED ELECTRON BEAM RESIN LAMINATED ON SUBSTRATE

FIELD OF THE INVENTION

The present invention relates to decorative materials having a surface protective layer obtained by crosslinking and curing an electron beam-curable resin composition which hardly suffer from deterioration of a substrate due to exposure to electron beam and are excellent in surface properties such as stain resistance, abrasion resistance and marring resistance.

BACKGROUND OF THE INVENTION

Decorative materials used in the applications including building interior materials such as walls, fittings for buildings such as doors, surface materials for furniture, etc., have been usually required to exhibit good surface properties such as abrasion resistance and stain resistance. Hitherto, there has been proposed the decorative sheet having a surface resin layer which is produced, for example, by forming a pattern layer on a substrate made of papers or plastics by a printing method, applying an ionizing radiation-curable resin coating material on the substrate to form a coating resin layer, and then irradiating an electron beam to the coating resin layer for crosslinking and curing the resin composition to form the surface resin layer (for example, refer to Japanese Patent Publication No. 31033/1974). When such a surface resin layer obtained by irradiating an ionizing radiation such as an electron beam to the applied ionizing radiation-curable resin made of monomers, prepolymers, etc., to crosslink and cure the resin is provided as an outermost layer of a decorative sheet, the resultant decorative sheet is excellent in abrasion resistance, stain resistance, etc., due to a high crosslinkability thereof.

However, when irradiating the ionizing radiation for crosslinking the surface resin layer, the conventional decorative materials, for example, those using a substrate made of papers, tend to suffer from cutting or breaking of cellulose molecules of pulps in the paper substrate to thereby generate a carboxyl group or a carbonyl group at a cut or broken end of the molecules. As a result, the paper substrate tends to be deteriorated in strength, resulting in deteriorated processability of the decorative material. Whereas, a plastic substrate also tends to suffer from cutting or breaking of polymer molecular chains upon irradiation of the ionizing radiation, resulting in deterioration in strength thereof. For these reasons, when the decorative sheet is laminated under pressure on the substrate as an adherend such as plywood through an adhesive, the decorative sheet tends to undergo increased tension, resulting in occurrence of split therein due to mechanical vibration, etc.

In particular, when the decorative sheet is laminated on curved portions of the adherend substrate or corner edge portions of such an adherend substrate having a polyhedral column shape by a wrapping process, the decorative sheet tends to suffer from concentrated local stress, resulting in breakage of the decorative sheet. The wrapping method is explained in detail by referring to the conceptual view shown in FIG. 2.

Figure 2:
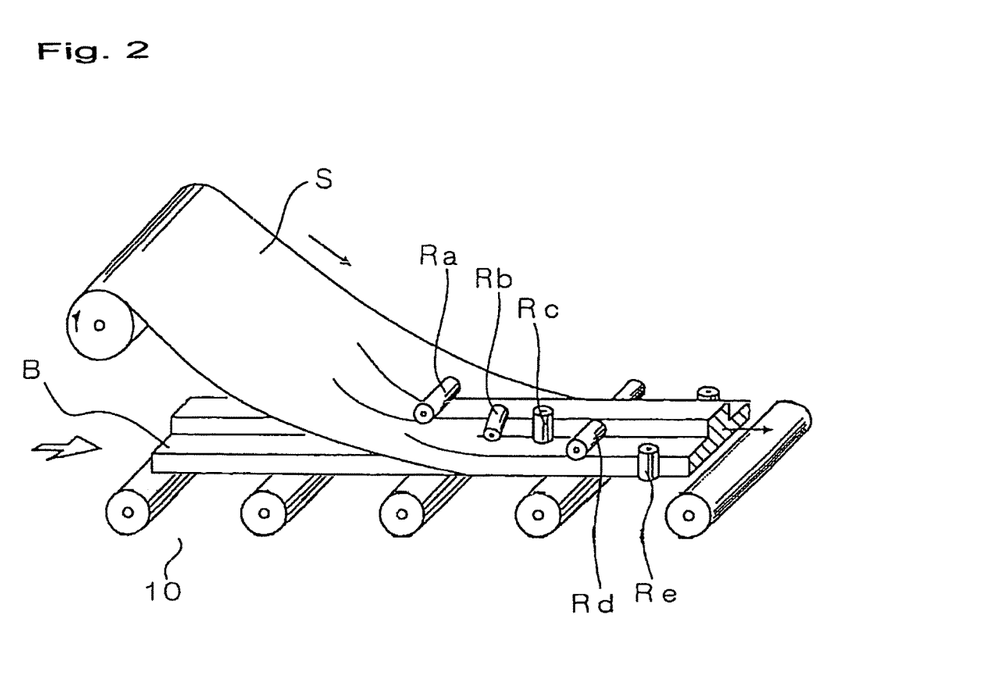
FIG. 2 is a conceptional view showing a wrapping process.
Figure 3:
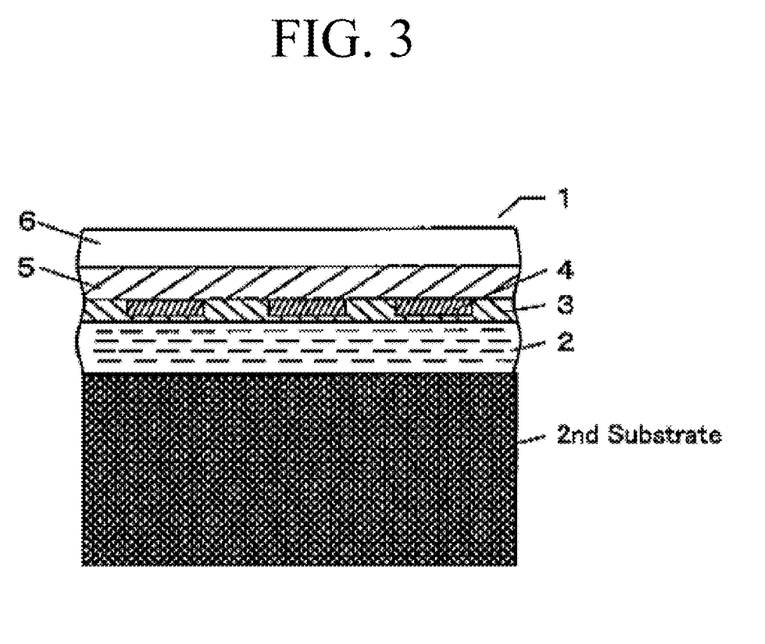
FIG. 3 is a schematic view showing a section of a decorative material according to the present invention, in which the decorative material has a second substrate (represented in the figure by the term "2nd substrate").

As shown in FIG. 2, a column-shaped substrate B is placed on a transport apparatus 10, and transported in a length direction thereof [MD direction (longitudinal direction: machine direction) of the substrate, i.e., the direction shown by an outlined arrow in FIG. 2]. A wrapping decorative sheet S is fed onto the column-shaped substrate B at a speed synchronized with a transporting speed of the substrate, and laminated on plural side surfaces of the column-shaped substrate by means of a plurality of pressing rollers Ra to Re which are arranged in different directions from each other. The lamination of the wrapping decorative sheet S is stepwise conducted every small area portion thereof in the direction substantially perpendicular or just perpendicular to the longitudinal direction of the column-shaped substrate (CD direction: cross machine direction). The wrapping decorative sheet S is first laminated on a central portion of a side surface of the column-shaped substrate in the width direction thereof by means of the pressing roller Ra, and then successively laminated on adjacent portions of the side surface of the column-shaped substrate by means of the pressing rollers Rb and Rc and further on outer adjacent portions of the side surface of the column-shaped substrate by means of the pressing rollers Rd and Re to cover the desired side surface of the column-shaped substrate with the wrapping decorative sheet. Upon such a wrapping process, since the wrapping decorative sheet is pressed by the pressing rollers Ra to Re under tension applied in the CD direction, the strength thereof, in particular, in the CD direction, is important.

On the other hand, for the purpose of improving a processability of such a decorative material having a surface protective layer obtained by crosslinking and curing an ionizing radiation-curable resin, there has been proposed the decorative material composed of a surface resin layer made of a crosslinked product of the ionizing radiation-curable resin, a paper substrate and a high-modulus resin layer having a specific tensile strength which are laminated on each other from its front-side surface toward its backside surface in this order (refer to claims of Japanese Patent Application Laid-open No. 14490/2002).

Thus, when the high-modulus resin layer is provided on the backside surface of the paper substrate, even though cellulose molecules of pulps of the paper substrate is cut or broken owing to irradiation with the ionizing radiation to thereby cause deterioration in strength of the paper substrate, the deteriorated strength of the paper substrate can be compensated with the high-modulus resin layer on the backside surface, so that the decorative sheet can maintain a suitable strength as a whole. As a result, the resultant decorative sheet can exhibit not only good surface properties such as abrasion resistance owing to the provision of the surface protective layer but also good processability.

However, the above conventional method requires formation of the high-modulus resin layer, resulting in various limitations to production of the decorative materials. Therefore, it has been demanded to provide the method of suppressing deterioration of the substrate itself.

DISCLOSURE OF THE INVENTION

The present invention has been made in view of the above conventional problems. An object of the present invention is to provide a decorative material which hardly undergoes deterioration of the substrate even when irradiated with an electron beam, and is excellent in surface properties such as stain resistance and abrasion resistance.

As a result of intensive and extensive researches to achieve the above object, the inventors have found that when an acceleration voltage and an exposure dose of electron beam applied is well controlled according to kind of the substrate, more specifically, when a rate of reduction in a folding endurance of a material obtained by applying an electron beam-curable resin composition onto the substrate and then irradiating an electron beam thereto, relative to a folding endurance of the substrate before applying the electron beam-curable resin composition thereonto is controlled to 70% or lower as measured in the CD direction (lateral direction) of the substrate, the resultant decorative material hardly undergoes deterioration of the substrate even when irradiated with an electron beam, and can exhibit excellent surface properties such as stain resistance, abrasion resistance and marring resistance. The present invention has been accomplished on the basis of the finding.

Thus, the present invention provides:

(1) A decorative material comprising a substrate, and a pattern layer and/or a colored layer, and a surface protective layer which are successively laminated on the substrate, wherein the surface protective layer is obtained by crosslinking and curing an electron beam-curable resin composition, and a rate of reduction in a folding endurance of a material obtained by applying the electron beam-curable resin composition onto the substrate and then irradiating an electron beam to the electron beam-curable resin composition, relative to a folding endurance of the substrate before applying the electron beam-curable resin composition thereonto is 70% or lower as measured in the CD direction (lateral direction) of the substrate;

(2) the decorative material as described in the above aspect (1), wherein the electron beam is irradiated to the electron beam-curable resin composition at an acceleration voltage of 30 to 150 kV and an exposure dose of 30 to 70 kGy.

(3) the decorative material as described in the above aspect (1) or (2), wherein the substrate is a fibrous substrate;

(4) the decorative material as described in the above aspect (3), wherein the substrate is a cellulose-based substrate;

(5) A decorative plate comprising a substrate and the decorative material as described in any one of the above aspects (1) to (4) which is laminated on the substrate; and (6) a process for producing a decorative material comprising a substrate, and a pattern layer and/or a colored layer, and a surface protective layer which are successively laminated on the substrate, wherein the surface protective layer is obtained by crosslinking and curing an electron beam-curable resin composition, and the electron beam is irradiated to the electron beam-curable resin composition at an acceleration voltage of 30 to 150 kV and an exposure dose of 30 to 70 kGy.

Effect of the Invention

In accordance with the present invention, there is provided a decorative material which hardly suffers from deterioration of a substrate even when irradiated with an electron beam and is excellent surface properties such as stain resistance, abrasion resistance and marring resistance. More specifically, since the substrate is hardly deteriorated even when irradiated with an electron beam, the resultant decorative material can be improved in processability and, therefore, can follow even a complicated shape upon wrapping thereon. Further, the decorative material is free from breakage, for example, even when processed in the winter, i.e., under a low-temperature and dry atmosphere.

EXPLANATION OF REFERENCE NUMERALS

1: Decorative material; 2: Substrate; 3: Colored layer; 4: Pattern layer; 5: Penetration-preventing layer; 6: Surface protective layer; 10: Transport apparatus; B: Column-shaped substrate; S: Wrapping decorative sheet; Ra to Re: Pressing rollers

PREFERRED EMBODIMENTS FOR CARRYING OUT THE INVENTION

The decorative material of the present invention includes a substrate, a pattern layer and/or a colored layer formed on the substrate, and a surface protective layer which is formed on the pattern layer and/or colored layer either directly or through the other layer(s) by applying an electron beam-curable resin composition and irradiating an electron beam thereto for crosslinking and curing the resin composition. The decorative material of the present invention is characterized in that a rate of reduction in a folding endurance of the decorative material obtained after applying the electron beam-curable resin composition and irradiating an electron beam to the resin composition for crosslinking and curing thereof (hereinafter referred to as an "electron beam-irradiated decorative material") as measured in the CD direction (lateral direction) of the substrate, relative to a folding endurance of the decorative material before applying the electron beam-curable resin composition (hereinafter referred to merely as "dry paper") as measured in the same CD direction is 70% or lower. The folding endurance used herein means the number of folding reciprocating motions required until reaching breakage of a test specimen of the decorative material as measured according to TAPPI T511 [Folding Endurance of Paper (MIT Testing Machine)].

Figure 1:
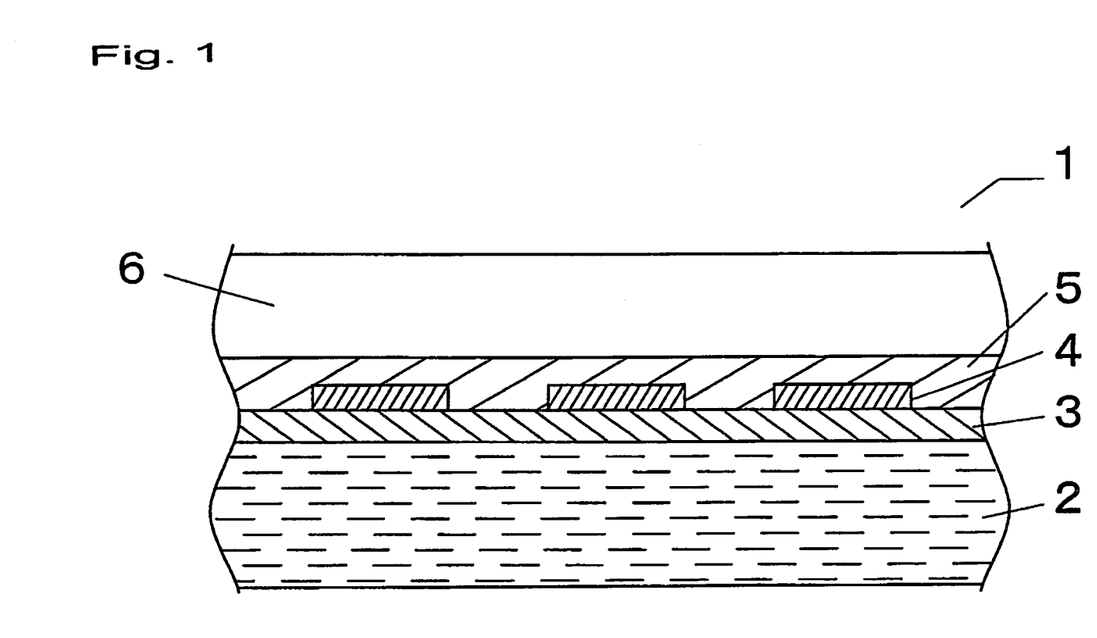
FIG. 1 is a schematic view showing a section of a decorative material according to the present invention.

The typical structure of the decorative material according to the present invention is explained by referring to FIG. 1 which is a schematic view showing a section of a decorative material 1 of the present invention. In the embodiment shown in FIG. 1, a colored layer 3 uniformly covering a whole surface of a substrate 2, a pattern layer 4, a uniform penetration-preventing layer 5 and a surface protective layer 6 obtained by crosslinking and curing an electron beam-curable resin composition are successively laminated on the substrate 2 in this order.

In order to control the rate of reduction in folding endurance of the electron beam-irradiated decorative material relative to a folding endurance of the dry paper to 70% or lower, although various factors are considered, it is important to suitably select the respective constituents of the decorative material and control the intensity and exposure dose of an electron beam irradiated for crosslinking and curing the surface protective layer 6. In the followings, the respective constituents as well as the intensity and exposure dose of the electron beam irradiated are explained in detail.

The substrate 2 used in the present invention is not particularly limited as long as it is ordinarily usable for decorative materials, and may be appropriately selected from fibrous substrates such as various papers, plastic films, plastic sheets, metal foils, metal sheets, metal plates, wood plates such as timber, and ceramic-based materials according to the applications thereof In the present invention, among these substrates, the fibrous substrates may be especially effectively used.

These materials may be used alone or in the form of a laminate composed of an optional combination thereof such as a composite of papers and a composite of a paper and a plastic film. One or both surfaces of the substrate, in particular, a plastic film substrate or a plastic sheet substrate, may be subjected to physical or chemical surface treatments such as those using an oxidation method or a convex/concave forming method, if required, in order to enhance adhesion of the substrate to the layer to be laminated thereon.

Examples of the treatments using the oxidation method include a corona discharge treatment, a chromate treatment, a flame treatment, a hot air treatment and an ozone/ultraviolet treatment. Examples of the treatments using the convex/concave forming method include a sand blast treatment and a solvent treatment. These surface treatments may be appropriately selectively conducted depending upon the kind of substrate used. In general, among these treatments, the corona discharge treatment is preferably used in view of good effects and facilitated operation thereof.

In addition, the substrate may also be treated to form a primer layer thereon. Further, the substrate may be coated with a suitable paint to adjust a hue thereof, or may be previously formed thereon with a pattern in view of imparting a good design thereto.

Examples of various papers used as the substrate include thin cut sheet papers, kraft papers and titanium papers. These paper substrates may further contain resins such as acrylic resins, styrene-butadiene rubbers, melamine resins and urethane resins in order to enhance an interlaminar bonding strength between fibers of the paper substrate or between the paper substrate and the other layers, or prevent formation of fuzzes (by either impregnation with the resins after papermaking or inclusion of the resins during paper-making). Examples of the resin-containing paper include interlaminar reinforced papers and resin-impregnated papers.

In addition to the above papers, as the substrate, there may be used various other papers which are frequently employed in building applications, such as linter papers, paper boards, base papers for gypsum boards and raw fabrics for vinyl-based wall papers which are composed of a paper and a vinyl chloride resin layer formed on a surface of the paper. Further, as the substrate, there may also be used such papers employed in business applications or for ordinary printing and packaging purposes such as coated papers, art papers, parchment papers, glassine papers, paraffin papers and Japanese papers. Although being distinguished from these papers, as the substrate, there may also be used woven fabrics and nonwoven fabrics of various fibers which have an appearance and properties similar to those of papers. Examples of various fibers include inorganic fibers such as glass fibers, asbestos fibers, potassium titanate fibers, alumina fibers, silica fibers and carbon fibers, and synthetic resin fibers such as polyester fibers, acrylic fibers and vinylon fibers.

In the present invention, among these paper substrates, cellulose-based substrates may be especially effectively used because cellulose molecules of pulps contained therein tend to be oriented in the MD direction (longitudinal direction) thereof. Such an MD orientation of the cellulose molecules causes considerable deterioration in folding endurance of the substrate in the CD direction (lateral direction) thereof owing to irradiation of en electron beam thereto, so that the effect of the present invention can be exhibited more remarkably when applied to the cellulose-based substrates.

The plastic film or the plastic sheet as the substrate may be made of various synthetic resins. Examples of the synthetic resins include polyethylene resins, polypropylene resins, polymethylpentene resins, polyvinyl chloride resins, polyvinylidene chloride resins, polyvinyl alcohol resins, vinyl chloride/vinyl acetate copolymer resins, ethylene/vinyl acetate copolymer resins, ethylene/vinyl alcohol copolymer resins, polyethylene terephthalate resins, polybutylene terephthalate resins, polyethylene naphthalate/isophthalate copolymer resins, polymethyl (meth)acrylate resins, polyethyl (meth)acrylate resins, polybutyl (meth)acrylate resins, polyamide resins such as typically nylon 6 and nylon 66, cellulose triacetate resins, cellophane, polystyrene resins, polycarbonate resins, polyallylate resins and polyimide resins.

Examples of the metal foil, metal sheet or metal plate include those made of aluminum, iron, stainless steel, copper, etc., as well as those plated with these metals. Examples of various wood plates include veneer, plywood, laminated wood, particle board, and wood fiber plates such as MDF (medium-density fiber board). Examples of the ceramic materials include ceramic building materials such as gypsum boards, calcium silicate boards and wood chip cement boards; pottery; glass; porcelain enamel; and baked tile. Examples of the other substrate include composites of various materials such as fiber-reinforced plastic (FRP) plates, laminates obtained by attaching an iron plate on both surfaces of a paper honeycomb, and laminates obtained by sandwiching a polyethylene resin sheet between two aluminum plates.

The thickness of the substrate 2 is not particularly limited. The thickness of the plastic sheet substrate is usually about 20 to 150 μm and preferably 30 to 100 μm. The basic weight of the paper substrate is usually about 20 to 150 g/m$^2$ and preferably 30 to 100 g/m$^2$.

The colored layer 3 as shown in FIG. 1 which is formed so as to cover a whole surface of the substrate is provided for enhancing a design property of the decorative material according to the present invention, and may also be referred to as a concealing layer or a whole surface solid layer. Thus, the colored layer 3 serves for coloring the surface of the substrate 2 as intended. The colored layer usually has an opaque color in many cases, but may also show a tinted transparent color to utilize an original pattern of the underlying layer. In the case where a white color of the substrate 2 is utilized or the substrate 2 itself is suitably tinted, it is not required to provide the colored layer 3.

The ink used for forming the colored layer may be those produced by appropriately mixing a binder with a colorant such as pigments and dyes, an extender pigment, a solvent, a stabilizer, a plasticizer, a catalyst and a hardening agent. The binder is not particularly limited. Examples of the binder include polyurethane-based resins, vinyl chloride/vinyl acetate-based copolymer resins, vinyl chloride/vinyl acetate/acrylic compound-based copolymer resins, chlorinated polypropylene-based resins, acrylic resins, polyester-based resins, polyamide-based resins, butyral-based resins, polystyrene-based resins, nitrocellulose-based resins and cellulose acetate-based resins. The binder may be optionally selected from these resins, and these resins may be used alone or in the form of a mixture of any two or more thereof.

Examples of the colorant used in the colored layer include inorganic pigments such as carbon black (Japanese ink), iron black, titanium white, antimony white, chrome yellow, titanium yellow, iron oxide red, cadmium red, ultramarine blue and cobalt blue; organic pigments and dyes such as quinacridone red, isoindolinone yellow and phthalocyanine blue; metallic pigments made of scale-like foil pieces of aluminum, brass, etc., and nacreous (pearl) pigments made of scale-like foil pieces of titanium dioxide-coated mica, basic lead carbonate, etc.

The thickness of the colored layer 3 is about 1 to 20 μm, and a so-called solid printing layer may be suitably used as the colored layer 3.

The pattern layer 4 shown in FIG. 1 serves for imparting a decorative design to the substrate 2, and is formed by printing various patterns with an ink using a printer. Examples of the patterns formed by the pattern layer 4 include woodgrain patterns, stone-grain patterns imitating the surface of rocks such as marble pattern (e.g., travertine marble pattern), cloth patterns imitating texture of cloth and fabric, tiling patterns, brick work patterns, and composite patterns thereof such as parquetry patterns and patchwork patterns. These patterns may be usually produced by multi-color printing with a process color including yellow, red, blue and black colors, or by multi-color printing with a special color using printing plates corresponding to individual colors of the pattern. The pattern ink used for forming the pattern layer 4 may be the same as the ink used for forming the colored layer 3.

The penetration-preventing layer 5 shown in FIG. 1 may be optionally provided according to requirements, and has a function of inhibiting penetration of an electron beam-curable resin for forming the surface protective layer 6 into the substrate 2. In particular, the effect of the penetration-preventing layer 5 becomes more remarkable when the substrate 2 is made of a permeable material such as papers and nonwoven fabrics. Therefore, the penetration-preventing layer 5 may be formed between the substrate 2 and the surface protective layer 6, for example, between the substrate 2 and the colored layer 3, between the colored layer 3 and the pattern layer 4 or between the pattern layer 4 and the surface protective layer 6 as shown in FIG. 1. As the penetration-preventing layer 5, a uniform layer obtained by crosslinking and curing a curable resin which exhibits a good adhesion to the electron beam-curable resin forming the surface protective layer 6 is usually provided between the pattern layer 4 and the surface protective layer 6 as shown in FIG. 1, thereby not only allowing the surface of the colored layer 3, the pattern layer 4, etc., if formed on the substrate 2, to be smoothened, but also exhibiting the effect of enhancing a bonding strength of these layers to the surface protective layer 6.

The surface protective layer 6 is formed by crosslinking and curing the electron beam-curable resin composition as described above. The electron beam-curable resin composition used herein means a resin composition capable of undergoing crosslinking and curing reactions upon irradiating an electron beam thereto. More specifically, the electron beam-curable resin composition usable in the present invention may be appropriately selected from polymerizable monomers and polymerizable oligomers or prepolymers thereof which are conventionally used as an electron beam-curable resin composition.

Typical examples of the suitable polymerizable monomers include (meth)acrylate monomers containing a radical-polymerizable unsaturated group in a molecule thereof. Among these (meth)acrylate monomers, preferred are polyfunctional (meth)acrylates. Meanwhile, the term "(meth) acrylate" used herein means an acrylate, a methacrylate or both thereof. The polyfunctional (meth)acrylates are not particularly limited as long as they have two or more ethylenically unsaturated bonds in a molecule thereof. Specific examples of the polyfunctional (meth)acrylates include ethylene glycol di(meth)acrylate, propylene glycol di(meth) acrylate, 1,4-butanediol di(meth)acrylate, 1,6-hexanediol di(meth)acrylate, neopentyl glycol di(meth)acrylate, polyethylene glycol di(meth)acrylate, neopentyl glycol di(meth) acrylate hydroxypivalate, dicyclopentenyl di(meth)acrylate, caprolactone-modified dicyclopentenyl di(meth)acrylate, ethyleneoxide-modified phospholic acid di(meth)acrylate, allylated cyclohexyl di(meth)acrylate, isocyanurate di(meth) acrylate, trimethylolpropane tri(meth)acrylate, ethyleneoxide-modified trimethylolpropane tri(meth)acrylate, dipentaei-ythritol tri(meth)acrylate, propionic acid-modified dipentaerythritol tri(meth)acrylate, pentaerythritol tri(meth) acrylate, propyleneoxide-modified trimethylolpropane tri (meth)acrylate, tris(acryloxyethyl) isocyanurate, propionic acid-modified dipentaerythritol penta(meth)acrylate, dipentaerythritol hexa(meth)acrylate, ethyleneoxide-modified dipentaerythritol hexa(meth)acrylate and caprolactone-modified dipentaerythritol hexa(meth)acrylate. These polyfunctional (meth)acrylates may be used alone or in combination of any two or more thereof.

In the present invention, for the purpose of reducing a viscosity of the polyfunctional (meth)acrylate, a monofunctional (meth)acrylate may be appropriately used in combination with the polyfunctional (meth)acrylate unless the effects of the present invention are adversely affected. Examples of the monofunctional (meth)acrylate include methyl (meth)acrylate, ethyl (meth)acrylate, propyl (meth) acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate and isobornyl (meth)acrylate. These monofunctional (meth) acrylates may be used alone or in combination of any two or more thereof.

As the polymerizable oligomer, there may be used oligomers having a radical-polymerizable unsaturated group in a molecule thereof. Examples of the polymerizable oligomers include epoxy (meth)acrylate-based oligomers, urethane (meth)acrylate-based oligomers, polyester (meth)acrylate-based oligomers and polyether (meth)acrylate-based oligomers. The epoxy (meth)acrylate-based oligomers may be produced, for example, by esterifying an oxirane ring of a relatively low-molecular weight bisphenol-type epoxy resin or novolak-type epoxy resin with (meth)acrylic acid. In addition, there may also be used carboxyl-modified epoxy (meth)acrylate oligomers obtained by partially modifying the above epoxy (meth)acrylate-based oligomers with a dibasic carboxylic anhydride. The urethane (meth)acrylate-based oligomers may be produced, for example, by esterifying a polyurethane oligomer obtained by reacting a polyether polyol or a polyester polyol with polyisocyanate, with (meth)acrylic acid. The polyester (meth)acrylate-based oligomers may be produced, for example, by esterifying a hydroxyl group of a polyester oligomer having hydroxyl groups at both terminal ends thereof which is obtained by condensation between a polycarboxylic acid and a polyhydric alcohol, with (meth)acrylic acid, or by esterifying a terminal hydroxyl group of an oligomer obtained by adding an alkyleneoxide to a polycarboxylic acid, with (meth) acrylic acid. The polyether (meth)acrylate-based oligomers may be produced, for example, by esterifying a hydroxyl group of a polyether polyol with (meth)acrylic acid.

Examples of the other polymerizable oligomers include polybutadiene (meth)acrylate-based oligomers having a high hydrophobic property which is in the form of a polybutadiene oligomer having a (meth)acrylate group in a side chain thereof, silicone (meth)acrylate-based oligomers having a polysiloxane bond in a main chain thereof, aminoplast resin (meth)acrylate-based oligomers obtained by modifying an aminoplast resin having a large number of reactive groups in a small molecule thereof, and oligomers having a cation-polymerizable functional group in a molecule thereof such as a novolak-type epoxy resin, a bisphenol-type epoxy resin, an aliphatic vinyl ether and an aromatic vinyl ether.

The electron beam-curable resin composition used in the present invention may also contain various additives according to required properties of the obtained cured resin layer. Examples of the additives include weather resistance-improving agents, abrasion resistance-improving agents, polymerization inhibitors, crosslinking agents, infrared-absorbing agents, antistatic agents, adhesion-improving agents, leveling agents, thixotropic agents, coupling agents, plasticizers, antifoaming agents, fillers, solvents and colorants.

As the weather resistance-improving agents, there may be used ultraviolet-absorbing agents or light stabilizers. The ultraviolet absorbing agents may be either inorganic or organic compounds. As the preferred inorganic ultraviolet absorbing agents, there may be used particles of titanium dioxide, cerium oxide or zinc oxide which have an average particle size of about 5 to 120 nm. As the organic ultraviolet absorbing agents, there may be used benzotriazole-based compounds. Specific examples of the benzotriazole-based compounds include 2-(2-hdyroxy-5-methylphenyl)benzotriazole, 2-(2-hydroxy-3,5-di-tert-aminophenyl)benzotriazole and 3-[3-(benzotriazol-2-yl)-5-tert-butyl-4-hydroxyphenyl] propionic ester of polyethylene glycol. Also, examples of the light stabilizer include hindered amine-based compounds. Specific examples of the light stabilizer include bis(1,2,2,6,6-pentamethyl-4-piperizyl) 2-(3,5-di-tert-butyl-4-hydroxybenzyl)-2'-n-butyl malonate, bis(1,2,2,6,6-pentamethyl-4-piperidyl) sebacate and tetrakis(2,2,6,6-tetramethyl-4-piperidyl)-1,2,3,4-butanetetracarboxylate. In addition, as the ultraviolet absorbing agent or the light stabilizer, there may also be used reactive ultraviolet absorbing agents or light stabilizers having a polymerizable group such as a (meth) acryloyl group in a molecule thereof.

Examples of the inorganic abrasion resistance-improving agent include generally-spherical particles of α-alumina, silica, kaolinite, iron oxide, diamond and silicon carbide. The shape of the inorganic abrasion resistance-improving agent may be a spherical shape, an ellipsoidal shape, a polyhedral shape or a scale-like shape. Among these shapes, preferred is the spherical shape although not particularly limited thereto. Examples of the organic abrasion resistance-improving agent include beads of synthetic resins such as crosslinked acrylic resins and polycarbonate resins. The particle size of the abrasion resistance-improving agent may be usually 30 to 200% of a thickness of the cure resin layer. Among these abrasion resistance-improving agents, spherical α-alumina particles are especially preferred because of high hardness, large effect of improving the abrasion resistance and relatively easy production of the spherical particles.

Examples of the polymerization inhibitor include hydroquinone, p-benzoquinone, hydroquinone monomethyl ether, pyrogallol and t-butyl catechol. Examples of the crosslinking agent used in the present invention include polyisocyanate compounds, epoxy compounds, metal chelate compounds, aziridine compounds and oxazoline compounds.

Examples of the filler include barium sulfate, talc, clay, calcium carbonate and aluminum hydroxide.

Examples of the colorant include known coloring pigments such as quinacridon red, isoindolinone yellow, phthalocyanine blue, phthalocyanine green, titanium oxide and carbon black.

Examples of the infrared-absorbing agent include dithiol-based metal complexes, phthalocyanine-based compounds and diimmonium compounds.

In the present invention, the above polymerizable monomers or polymerizable oligomers as the electron beam-curable component and various additives are intimately mixed with each other at a given mixing ratio to prepare a coating solution composed of the electron beam-curable resin composition. The viscosity of the coating solution is not particularly limited as long as the coating solution can be formed into an cured resin layer on a surface of the substrate by the below-mentioned coating method.

In the present invention, the thus prepared coating solution is applied onto a surface of the substrate in an amount capable of providing a cured coating layer having a thickness of 1 to 20 μm, by known methods such as gravure coating, bar coating, roll coating, reverse roll coating and Komma coating, preferably gravure coating, thereby forming an uncured resin layer thereon. The cured coating layer having a thickness of 1 μm or larger can exhibit good functions as required. The thickness of the cured surface protective layer is preferably about 2 to 20 μm.

In the present invention, the thus formed uncured resin layer is irradiated with an electron beam to cure the uncured resin layer. The acceleration voltage for the electron beam may be appropriately determined according to the kind of resin used and the thickness of the resin layer such that a rate of reduction in a folding endurance of the electron beam-irradiated decorative material relative to a folding endurance of the dry paper is 70% or lower. The higher acceleration voltage leads to increase in penetrability of the electron beam. Therefore, when using a substrate which tends to be deteriorated by exposure to the electron beam, the acceleration voltage may be controlled such that the depth of penetration of the electron beam is substantially identical to the thickness of the resin layer, thereby inhibiting an excessive amount of the electron beam from being irradiated to the substrate and minimizing deterioration of the substrate owing to irradiation with an excessive amount of the electron beam. In order to control the rate of reduction in folding endurance of the electron beam-irradiated decorative material to 70% or lower, the acceleration voltage applied to the electron beam is preferably as low as possible. More specifically, the acceleration voltage is preferably 30 to 150 kV and more preferably 70 to 130 kV. When the acceleration voltage is 30 kV or higher, a mechanical stability of the electron beam-irradiating apparatus can be ensured, whereas when the acceleration voltage is 150 kV or lower, the substrate can be inhibited from being deteriorated, thereby achieving the aimed effects of the present invention. Further, in view of preventing the deterioration of the substrate, the acceleration voltage is preferably controlled to 110 kV or lower, more preferably 90 kV or lower and still more preferably 70 kV or lower.

On the other hand, in view of not only preventing the deterioration of the substrate but also allowing the electron beam-curable resin composition to be sufficiently crosslinked and cured even under a relatively low acceleration voltage, the acceleration voltage is preferably controlled to 90 to 110 kV.

The exposure dose of the electron beam is preferably such an amount capable of saturating a crosslinking density of the resin layer, and may be selected from the range of usually 5 to 300 kGy, preferably 10 to 100 kGy and more preferably 30 to 70 kGy. In the present invention, since the acceleration voltage can be lowered, the substrate can be inhibited from being deteriorated. For this reason, the exposure dose of the electron beam can be increased. As a result, the crosslinking density of the resin layer forming the surface protective layer can be increased to a higher level than ordinarily, resulting in especially good surface properties of the resultant decorative material.

As described above, in the present invention, by suitably controlling the acceleration voltage and the exposure dose, it is possible to not only inhibit the deterioration of the substrate but also increase the crosslinking density of the surface protective layer. In view of a good balance between prevention of deterioration of the substrate and the high crosslinking density of the surface protective layer, the acceleration voltage is preferably in the range of 90 to 110 kV, and the exposure dose is preferably in the range of 50 to 70 kGy.

The electron beam source is not particularly limited, and examples of the electron beam source usable in the present invention include various electron beam accelerators such as Cockroft-Walton type, van de Graaff type, resonance transformer type, insulating core transformer type, linear type, Dynamitron type and high-frequency type.

The thus formed cured resin layer may also contain various additives to impart various functions or performances thereto. Examples of the various functions imparted by addition of the additives include those capable of attaining a high hardness and a good marring resistance such as functions of so-called hard coat, anti-fogging coat, anti-fouling coat, anti-glare coat, anti-reflecting coat, ultraviolet-shielding coat and infrared-shielding coat.

The decorative material of the present invention can be used as a decorative plate by attaching to various substrates. The substrate as an adherend is not particularly limited, and may be appropriately selected from plastic sheets, metal plates, wood plates such as timber, and ceramic materials according to the applications. One or both surfaces of these substrates, in particular, plastic sheet substrates, may be optionally subjected to various physical and chemical surface treatments such as those treatments using oxidation method and convex/concave forming method in order to enhance adhesion of the substrate to the decorative material.

Examples of the treatments using the oxidation method include corona discharge treatment, chromate treatment, flame treatment, hot air treatment and ozone/ultraviolet treatment. Examples of the convex/concave forming method include a sandblast method and a solvent-treating method. The surface treatment to be conducted may be appropriately selected according to the kind of substrate used, and in general, the corona discharge treatment is preferably used because of good effects and facilitated operation thereof.

The plastic sheets may be made of various synthetic resins. Examples of the synthetic resins include polyethylene resins, polypropylene resins, polymethylpentene resins, polyvinyl chloride resins, polyvinylidene chloride resins, polyvinyl alcohol resins, vinyl chloride/vinyl acetate copolymer resins, ethylene/vinyl acetate copolymer resins, ethylene/vinyl alcohol copolymer resins, polyethylene terephthalate resins, polybutylene terephthalate resins, polyethylene naphthalate/isophthalate copolymer resins, polymethyl methacrylate resins, polyethyl methacrylate resins, polybutyl acrylate resins, polyamide resins such as typically nylon 6 and nylon 66, cellulose triacetate resins, cellophane, polystyrene resins, polycarbonate resins, polyallylate resins and polyimide resins.

Examples of the metal plates include those plates made of aluminum, iron, stainless steel, copper, etc. In addition, there may also be used those substrates which are plated with these metals.

Examples of the wood plates include sliced veneers, veneers, plywood, particle boards and medium-density fiber (MDF) boards which are made of various materials such as Japanese cryptmeria, hinoki cypress, keyaki, pine, lauan, teak and Melapi. These wood plates may be used alone or in the form of a laminate of any two or more thereof. Meanwhile, the wood plates used herein involve not only plates made of wooden materials, but also plastic plates containing paper powder and reinforced high-strength papers.

Examples of the ceramic materials include ceramic-based building materials such as gypsum boards, calcium silicate boards and wood chip cement boards, pottery, glass, porcelain enamels, baked tiles and boards made of volcanic ash as a main raw material.

In addition to the above illustrated substrates, there may also be used composite plates of various materials such as a fiber-reinforced plastic (FRP) plate, a plate produced by attaching an iron plate onto both surfaces of a paper honeycomb and a polyethylene resin sheet sandwiched between two aluminum plates.

The substrate may be subjected to further treatments for forming a primer layer thereon, adjusting a hue thereof by painting, or previously providing a designed pattern thereon in view of a good design property thereof. The substrate as an adherend may be a plate material such as a flat plate or a curved plate made of various materials, or a three-dimensional product (molded article) in which the materials are used singly or in the form of a composite thereof.

The substrate may be attached with a backing or lining material such as Japanese papers, machine-made papers, synthetic papers, nonwoven fabrics, woven fabrics, cheese cloths, impregnated papers and synthetic resin sheets. By using such a substrate to which the backing or lining material is attached, the decorative material can be reinforced by itself, and can be effectively prevented from suffering from occurrence of cracks or rupture and bleeding of adhesives onto a surface thereof, resulting in reduction of defectives and facilitated handling procedure as well as increased yield.

The substrate on which the decorative material in the form of a cut sheet or a continuous sheet is placed through an adhesive is then pressed or compressed using a laminating apparatus such as a cold press, a hot press, a roll press, a laminator, a wrapping machine, a edge-bonding machine and a vacuum press to allow the decorative material to adhere to a surface of the substrate, thereby producing a decorative plate.

The adhesive may be applied using a coating apparatus such as a spray coater, a spreader and a bar coater. Examples of the adhesive include vinyl acetate resin-based adhesives, urea resin-based adhesives, melamine resin-based adhesives, phenol resin-based adhesives and isocyanate-based adhesives. These adhesives may be used alone or in the form of a mixed adhesive obtained by mixing any two or more thereof with each other at an optional mixing ratio. The adhesive may contain, if required, inorganic powder such as talc, calcium carbonate, clay and titanium white, wheat flour, wood chips, plastic chips, colorants, insecticides, mildew-proof agents, etc. In general, the adhesive has a solid content of 35 to 80% by mass, and is applied onto the surface of the substrate in an amount of 50 to 300 g/m$^2$.

The decorative material may be usually attached onto the substrate by forming an adhesive layer on a back surface of the decorative material of the present invention and then bonding the substrate onto the adhesive layer, or by applying an adhesive onto the substrate and then bonding the decorative material onto the substrate through the adhesive.

The thus produced decorative plate may be cut into an optional size, and then the surface or butt end portion thereof may be subjected to optional decorating processes such as grooving and chamfering by means of a cutting machine such as a router and a cutter. The resultant decorative plate may be used in various applications, e.g., interior or exterior materials for buildings such as walls, ceilings and floors; surface decorative plates for fittings such as window frames, doors, balustrades, baseboards, verandahs and malls as well as surface decorative plates for kitchen wares, furniture, light-electrical appliances or OA devices, interior and exterior equipments for vehicles, etc.

EXAMPLES

The present invention will be described in more detail by referring to the following examples. However, it should be noted that these examples are only illustrative and not intended to limit the invention thereto.

(Evaluation Methods)

(1) Folding Endurance

The folding endurance of the decorative material was evaluated as follows. That is, a test specimen of the decorative material was subjected to folding endurance test according to TAPPI T511 (Folding Endurance of Papers (MIT testing machine)) to measure the number of folding reciprocating motions required until reaching breakage of the test specimen of the decorative material which was determined as a folding endurance of the decorative material. The folding endurance of the decorative material was measured in both the MD direction (longitudinal direction) and the CD direction (lateral direction) of the substrate.

(2) Tensile Strength and Tensile Elongation

According to JIS K-7161, a test specimen of the decorative material was pulled at a constant speed of 20 mm/s using a tension/compression tester available from A & D Co., Ltd., to measure a maximum load (i.e., a tensile strength (kgf)) applied until reaching breakage of the test specimen, and an elongation (i.e., a tensile elongation (%)) required until reaching breakage of the test specimen.

(3) Stain Resistance

According to JIS K-6902, contaminants were applied onto a surface of the decorative material, and then wiped off. The surface of the decorative material was observed by naked eyes to determine the extent of any residual contaminants remaining thereon. The results were evaluated according to the following criteria:

◎: No contaminants remained

Δ: Slight amount of contaminants remained, but within practically acceptable level x: Considerable amount of contaminants remained (4) Abrasion Resistance The decorative material was subjected to JAS Abrasion C Test or JAS Abrasion A Test. The surface of the decorative material after being subjected to a specific number of the tests was observed to determine a residual percentage of patterns thereon.

(5) Marring Resistance

Steel wool (#0000) was fitted to a weight adjusted to a load of 29.4 kPa (300 g/cm$^2$), and the surface of the decorative material was rubbed with the steel wool 5 times. The rubbed surface portion of the decorative material was observed by naked eyes to determine the change in gloss, and the results were evaluated according to the following criteria:

◎: No change in gloss occurred

Δ: Slight change in gloss occurred, but within practically acceptable level x: Severe change in gloss occurred (6) Releasability of Cellophane Tape A cellophane tape (cellophane adhesive tape "CELLO-TAPE" (trademark) available from Nichiban Co., Ltd.; width: 2.5 mm) was attached onto a surface of the decorative material, and then forcibly peeled off. The releasability was evaluated by a load required for peeling off the cellophane tape from the decorative material. Meanwhile, the smaller peel strength means more preferred results.

Example 1

Using an ordinary paper for building materials having a basis weight of 30 g/m$^2$ as the substrate 2, a whole solid printing layer having a coating amount of 17 g/m$^2$ was formed on one surface of the substrate with an urethane-based ink containing nitrocellulose as a binder by a gravure printing method, thereby forming a colored layer 3. Then, a penetration-preventing layer 5 (primer layer) was formed on the colored layer 3 using an acrylic ink.

Next, an electron beam-curable resin composition composed of 60 parts by mass of ethyleneoxide-modified trimethylolpropane ethyleneoxide triacrylate as a trifunctional acrylate monomer, 40 parts by mass of dipentaerythritol hexaacrylate as a hexafunctional acrylate monomer, 2 parts by mass of silica particles having an average particle size of 5 μm and 1 part by mass of a silicone acrylate prepolymer was applied in a coating amount of 5 g/m$^2$ on the penetration-preventing layer 5 (primer layer) by a gravure offset coater method. After coating, an electron beam was irradiated to the thus applied electron beam-curable resin composition at an acceleration voltage of 110 kV and an exposure dose of 30 kGy (3 Mrad) to cure the composition, thereby forming a surface protective layer 6. Then, the resultant laminate was cured at 70° C. for 24 h, thereby obtaining a decorative material. The thus obtained decorative material was examined to evaluate the above properties. The results are shown in Table 1.

Example 2

The same procedure as in Example 1 was repeated except that the exposure dose of the electron beam irradiated was changed to 50 kGy (5 Mrad), thereby obtaining a decorative material. The thus obtained decorative material was examined to evaluate the above properties. The results are shown in Table 1.

Comparative Example 1

The same procedure as in Example 1 was repeated except that the acceleration voltage for the electron beam irradiated was changed to 175 kV, thereby obtaining a decorative material. The thus obtained decorative material was examined to evaluate the above properties. The results are shown in Table 1.

Example 3

Using an interlaminar-reinforced paper for building materials having a basis weight of 60 g/m$^2$ as the substrate 2, a (whole surface solid) layer having a coating amount of 6 g/m² was formed on one surface of the substrate with a nitrocellulose-based ink containing an acrylic resin as a binder by a gravure printing method, thereby forming a colored layer 3. Using an alkyd-based ink containing nitrocellulose as a binder, gravure printing was conducted to form a pattern layer 4 with a woodgrain pattern on the colored layer 3. Then, a butyral/urethane-based ink was gravure-printed in a coating amount of 1 g/m² over a whole surface of the underlying layers to form a penetration-preventing layer 5 (primer layer).

Next, an electron beam-curable resin composition composed of 60 parts by mass of ethyleneoxide-modified trimethylolpropane ethyleneoxide triacrylate as a trifunctional acrylate monomer, 40 parts by mass of dipentaerythritol hexaacrylate as a hexafunctional acrylate monomer, 2 parts by mass of silica particles having an average particle size of 5 μm and 1 part by mass of a silicone acrylate prepolymer was applied in a coating amount of 13 g/m² on the penetration-preventing layer 5 by a gravure offset coater method. After coating, an electron beam was irradiated to the thus applied electron beam-curable resin composition at an acceleration voltage of 110 kV and an exposure dose of 30 kGy (3 Mrad) to cure the composition, thereby forming a surface protective layer 6. Then, the resultant laminate was cured at 70° C. for 24 h, thereby obtaining a decorative material. The thus obtained decorative material was examined to evaluate the above properties. The results are shown in Table 1.

Example 4

The same procedure as in Example 3 was repeated except that the exposure dose of the electron beam irradiated was changed to 50 kGy (5 Mrad), thereby obtaining a decorative material. The thus obtained decorative material was examined to evaluate the above properties. The results are shown in Table 1.

Comparative Example 2

The same procedure as in Example 1 was repeated except that the acceleration voltage for the electron beam irradiated was changed to 175 kV, thereby obtaining a decorative material. The thus obtained decorative material was examined to evaluate the above properties. The results are shown in Table 1.

TABLE 1-1

|  |  |  | Example 1 | Example 2 | Com. Ex. 1 |
|---|---|---|---|---|---|
| Acceleration voltage (kV) | | | 110 | 110 | 175 |
| Exposure dose (kGy) | | | 30 | 50 | 30 |
| Folding endurance | MD direction | Dry paper | 561 | 561 | 561 |
|  |  | Electron beam-irradiated decorative material | 491 | 207 | 156 |
|  |  | Reduction rate (%) | 12 | 67 | 72 |
|  | CD direction | Dry paper | 338 | 338 | 338 |
|  |  | Electron beam-irradiated decorative material | 165 | 146 | 58 |
|  |  | Reduction rate (%) | 51 | 57 | 83 |
| Tensile strength (kgf) | MD direction | Dry paper | 4.8 | 4.8 | 4.8 |
|  |  | Electron beam-irradiated decorative material | 4.7 | 4.1 | 4.8 |
|  | CD direction | Dry paper | 3.7 | 3.7 | 3.7 |
|  |  | Electron beam-irradiated decorative material | 3.9 | 3.9 | 3.7 |
| Tensile elongation (%) | MD direction | Dry paper | 3.6 | 3.6 | 3.6 |
|  |  | Electron beam-irradiated decorative material | 3.9 | 3.1 | 3.4 |
|  | CD direction | Dry paper | 4.1 | 4.1 | 4.1 |
|  |  | Electron beam-irradiated decorative material | 4.0 | 3.3 | 3.7 |
| Stain resistance | | | ○ | ◎ | ○ |
| Abrasion resistance | | JAS C abrasion test | 100 | 100 | 100 |
|  | | JAS A abrasion test | — | — | — |
| Marring resistance | | | ◎ | ◎ | ◎ |
| Releasability of cellophane tape (gf) | | | 37 | 40 | 39 |

TABLE 1-2

|  |  |  | Example 3 | Example 4 | Com. Ex. 2 |
|---|---|---|---|---|---|
| Acceleration voltage (kV) | | | 110 | 110 | 175 |
| Exposure dose (kGy) | | | 30 | 50 | 30 |
| Folding endurance | MD direction | Dry paper | 1007 | 1007 | 1007 |
|  |  | Electron beam-irradiated decorative material | 550 | 260 | 213 |
|  |  | Reduction rate (%) | 45 | 74 | 79 |
|  | CD direction | Dry paper | 1791 | 1791 | 1791 |
|  |  | Electron beam-irradiated decorative material | 1101 | 765 | 447 |
|  |  | Reduction rate (%) | 39 | 57 | 75 |
| Tensile strength (kgf) | MD direction | Dry paper | 4.8 | 4.8 | 4.8 |
|  |  | Electron beam-irradiated decorative material | 7.9 | 6.7 | 7.0 |
|  | CD direction | Dry paper | 3.6 | 3.6 | 3.6 |
|  |  | Electron beam-irradiated decorative material | 5.9 | 5.4 | 5.3 |
| Tensile elongation (%) | MD direction | Dry paper | 3.6 | 3.6 | 3.6 |
|  |  | Electron beam-irradiated decorative material | 4.6 | 3.7 | 3.5 |
|  | CD direction | Dry paper | 8.2 | 8.2 | 8.2 |
|  |  | Electron beam-irradiated decorative material | 12.7 | 10.4 | 10.4 |
| Stain resistance | | | ○ | ○ | ○ |
| Abrasion resistance | | JAS C abrasion test | — | — | — |
|  | | JAS A abrasion test | 30 | 30 | 30 |
| Marring resistance | | | ○ | ○ | ○ |
| Releasability of cellophane tape (gf) | | | 43 | 43 | 46 |

Reference Example 1

A particle board as a substrate having a thickness of 9 mm was bonded onto a back surface of the decorative material obtained in Example 1 through an adhesive layer formed by applying onto the particle board, an urea-based synthetic resin adhesive "OHSHIKA RESIN" available from Ohshika Co., Ltd., in a coating amount of 60 g/m² (wet), thereby producing a wooden decorative plate.

INDUSTRIAL APPLICABILITY

In accordance with the present invention, there can be obtained a decorative material which hardly undergoes deterioration of a substrate even upon irradiation with an electron beam and is excellent in surface properties such as stain resistance and abrasion resistance. The decorative material is suitably used in various applications including interior materials for buildings such as walls, surface materials for fittings such as doors, or furniture, etc.

What is claimed is:

1. A decorative material consisting of:
(I) a first substrate consisting of a single layer;
(II) a colored layer;
(III) a pattern layer;
(IV) a penetration preventing layer; and
(V) a surface protective layer; layers (II), (III), (IV), and (V) being successively laminated on the substrate in that order; wherein the surface protective layer contacts only the penetration preventing layer, wherein the penetration prevention layer is a uniform layer, wherein the surface protective layer is obtained by crosslinking and curing an electron beam-curable resin composition, and a rate of reduction in a folding endurance of a material obtained by applying the electron beam-curable resin composition onto the substrate and then irradiating an electron beam to the electron beam-curable resin composition, relative to a folding endurance of the substrate before applying the electron beam-curable resin composition thereonto, is 70% or lower as measured in the CD direction (lateral direction) of the substrate, wherein the penetration preventing layer completely covers layers (II) or (III) such that it prevents penetration into these layers during the crosslinking and curing of the surface protective layer, wherein the electron beam is irradiated to the electron beam-curable resin composition at an acceleration voltage of 30 to 150 kV and an exposure dose of 30 to 70 kGy, and wherein each of the colored layer, the pattern layer, and the penetration preventing layer do not comprise polyurethane, wherein the substrate is a fibrous substrate, wherein penetration preventing layer is obtained by crosslinking and curing a curable resin, wherein the resin in the electron beam-curable resin consists of polyfunctional (meth)acrylate monomers having two or more ethylenically unsaturated bonds in a molecule thereof, and which is laminated on curved portions of an adherend substrate or corner edge portions of the adherend substrate, wherein the adherend substrate has a polyhedral column shape.

2. The decorative material according to claim 1, wherein the substrate comprises cellulose molecules.

3. A decorative plate comprising a second substrate and the decorative material as defined in claim 1 which is laminated on the second substrate.

4. A process for producing a decorative material consisting of:
(I) a first substrate consisting of a single layer;
(II) a colored layer;
(III) a pattern layer;
(IV) a penetration preventing layer; and
(V) a surface protective layer; layers (II), (III), (IV), and (V) being successively laminated on the substrate in that order; wherein the surface protective layer contacts only the penetration preventing layer, wherein the penetration prevention layer is a uniform layer, wherein the surface protective layer is obtained by crosslinking and curing an electron beam-curable resin composition, and a rate of reduction in a folding endurance of a material obtained by applying the electron beam-curable resin composition onto the substrate and then irradiating an electron beam to the electron beam-curable resin composition, relative to a folding endurance of the substrate before applying the electron beam-curable resin composition thereonto, is 70% or lower as measured in the CD direction (lateral direction) of the substrate, wherein the penetration preventing layer completely covers layers (II) or (III) such that it prevents penetration into these layers during the crosslinking and curing of the surface protective layer, wherein the electron beam is irradiated to the electron beam-curable resin composition at an acceleration voltage of 30 to 150 kV and an exposure dose of 30 to 70 kGy, and wherein each of the colored layer, the pattern layer, and the penetration preventing layer do not comprise polyurethane, wherein the substrate is a fibrous substrate, wherein penetration preventing layer is obtained by crosslinking and curing a curable resin, wherein the resin in the electron beam-curable resin consists of polyfunctional (meth)acrylate monomers having two or more ethylenically unsaturated bonds in a molecule thereof, and which is laminated on curved portions of an adherend substrate or corner edge portions of the adherend substrate, wherein the adherend substrate has a polyhedral column shape, wherein said process comprises obtaining the surface protective layer of the decorative material by crosslinking and curing the electron beam-curable resin composition, wherein the electron beam is irradiated to the electron beam-curable resin composition at an acceleration voltage of 30 to 150 kV and an exposure dose of 30 to 70 kGy.

5. The decorative material according to claim 1, wherein the penetration preventing layer consists of a curable resin.

6. The decorative material according to claim 5, wherein the penetration preventing layer consists of acrylic resin.

* * * * *